(12) United States Patent
Kortum et al.

(10) Patent No.: US 7,337,220 B2
(45) Date of Patent: Feb. 26, 2008

(54) UNIFIED INTERFACE FOR MANAGING DSL SERVICES

(75) Inventors: Philip Ted Kortum, Austin, TX (US); Marc Andrew Sullivan, Austin, TX (US)

(73) Assignee: AT&T Labs, Inc., Austin, TX (US)

( * ) Notice: Subject to any disclaimer, the term of this patent is extended or adjusted under 35 U.S.C. 154(b) by 764 days.

(21) Appl. No.: 09/983,451

(22) Filed: Oct. 24, 2001

(65) Prior Publication Data

US 2003/0079028 A1    Apr. 24, 2003

(51) Int. Cl.
G06F 15/173    (2006.01)
H04L 12/28    (2006.01)

(52) U.S. Cl. ............... 709/223; 370/351; 709/227; 709/238

(58) Field of Classification Search ............ 709/223, 709/225, 227–229, 250; 370/351
See application file for complete search history.

(56) References Cited

U.S. PATENT DOCUMENTS

| | | | |
|---|---|---|---|
| 4,232,199 A | 11/1980 | Boatwright et al. | |
| 4,266,098 A | 5/1981 | Novak | |
| 4,296,463 A | 10/1981 | Dalboussiere et al. | |
| 4,429,188 A | 1/1984 | Allen et al. | |
| 4,611,094 A | 9/1986 | Asmuth et al. | |
| 4,611,096 A | 9/1986 | Asmuth et al. | |
| 4,788,718 A | 11/1988 | McNabb | |
| 4,860,347 A | 8/1989 | Costello | |
| 4,878,240 A | 10/1989 | Lin et al. | |
| 4,897,866 A | 1/1990 | Majmudar et al. | |
| 4,899,373 A | 2/1990 | Lee et al. | |
| 5,054,055 A | 10/1991 | Hanle et al. | |
| 5,109,408 A | 4/1992 | Greenspan et al. | |
| 5,200,995 A | 4/1993 | Gaukel et al. | |
| 5,222,125 A | 6/1993 | Creswell et al. | |
| 5,241,588 A | 8/1993 | Babson, III et al. | |
| 5,247,571 A | 9/1993 | Kay et al. | |
| 5,294,229 A | 3/1994 | Hartzell et al. | |
| 5,333,185 A | 7/1994 | Burke et al. | |
| 5,337,351 A | 8/1994 | Manabe et al. | |
| 5,345,380 A | 9/1994 | Babson, III et al. | |
| 5,353,331 A | 10/1994 | Emery et al. | |
| 5,396,546 A | 3/1995 | Remillard | |

(Continued)

FOREIGN PATENT DOCUMENTS

EP    0611083    8/1994

(Continued)

OTHER PUBLICATIONS

"MegaHub PACE SMS- Service Management System- Advanced Intelligent Network Systems," Communications Corporation, Issue 0.4, Jul. 17, 1994.

(Continued)

*Primary Examiner*—Nathan Flynn
*Assistant Examiner*—Ashok Patel
(74) *Attorney, Agent, or Firm*—Greenblum & Bernstein, P.L.C.

(57) ABSTRACT

The present invention relates to a graphical user interface that allows a user to access, maintain, and troubleshoot services over a single digital subscriber line (DSL) through a unified interface. The interface permits the subscriber to simultaneously connect to multiple Internet connections and services.

19 Claims, 11 Drawing Sheets

U.S. PATENT DOCUMENTS

| | | |
|---|---|---|
| 5,398,220 A | 3/1995 | Barker |
| 5,404,396 A | 4/1995 | Brennan |
| 5,436,957 A | 7/1995 | McConnell |
| 5,438,568 A | 8/1995 | Weisser, Jr. |
| 5,444,768 A | 8/1995 | Lemaire et al. |
| 5,448,631 A | 9/1995 | Cain |
| 5,463,682 A | 10/1995 | Fisher et al. |
| 5,467,388 A | 11/1995 | Redd, Jr. et al. |
| 5,469,500 A | 11/1995 | Satter et al. |
| 5,479,487 A | 12/1995 | Hammond |
| 5,483,582 A | 1/1996 | Pugh et al. |
| 5,533,102 A | 7/1996 | Robinson et al. |
| 5,544,320 A | 8/1996 | Konrad |
| 5,548,566 A | 8/1996 | Barker |
| 5,550,909 A | 8/1996 | Chanda et al. |
| 5,572,583 A | 11/1996 | Wheeler, Jr. et al. |
| 5,579,384 A | 11/1996 | Seymor |
| 5,583,564 A | 12/1996 | Rao et al. |
| 5,592,541 A | 1/1997 | Fleischer, III et al. |
| 5,615,252 A | 3/1997 | Sizer, II et al. |
| 5,625,676 A | 4/1997 | Greco et al. |
| 5,629,978 A | 5/1997 | Blumhardt et al. |
| 5,642,410 A | 6/1997 | Walsh et al. |
| 5,655,013 A | 8/1997 | Gainsboro |
| 5,657,451 A | 8/1997 | Khello |
| 5,680,446 A | 10/1997 | Fleischer, III et al. |
| 5,687,212 A | 11/1997 | Kinser, Jr. et al. |
| 5,696,815 A | 12/1997 | Smyk |
| 5,740,438 A | 4/1998 | Ratcliff et al. |
| 5,742,668 A | 4/1998 | Pepe et al. |
| 5,751,707 A | 5/1998 | Volt et al. |
| 5,754,636 A | 5/1998 | Bayless et al. |
| 5,758,351 A | 5/1998 | Gibson et al. |
| 5,764,748 A | 6/1998 | Rosenthal et al. |
| 5,787,237 A | 7/1998 | Reilly |
| 5,790,173 A | 8/1998 | Strauss et al. |
| 5,796,806 A | 8/1998 | Birckbichler |
| 5,796,950 A | 8/1998 | Sips et al. |
| 5,799,073 A | 8/1998 | Fleischer, III et al. |
| 5,802,157 A | 9/1998 | Clarke et al. |
| 5,802,159 A | 9/1998 | Smolentzov et al. |
| 5,805,587 A | 9/1998 | Norris et al. |
| 5,822,419 A | 10/1998 | Enstone et al. |
| 5,864,613 A | 1/1999 | Flood |
| 5,867,562 A | 2/1999 | Scherer |
| 5,870,549 A | 2/1999 | Bobo, II |
| 5,881,144 A | 3/1999 | Havens |
| 5,892,822 A | 4/1999 | Gottlieb et al. |
| 5,915,008 A | 6/1999 | Dulman |
| 5,917,817 A | 6/1999 | Dunn et al. |
| 5,920,618 A | 7/1999 | Fleischer, III et al. |
| 5,933,490 A | 8/1999 | White et al. |
| 5,933,778 A | 8/1999 | Buhrmann et al. |
| 5,937,050 A | 8/1999 | Yue et al. |
| 5,940,488 A | 8/1999 | DeGrazia et al. |
| 5,946,381 A | 8/1999 | Danne et al. |
| 5,958,016 A | 9/1999 | Chang et al. |
| 5,982,774 A | 11/1999 | Foladare et al. |
| 5,982,870 A | 11/1999 | Pershan et al. |
| 5,999,611 A | 12/1999 | Tatchell et al. |
| 6,028,917 A | 2/2000 | Creamer et al. |
| 6,032,184 A | 2/2000 | Cogger et al. |
| 6,038,296 A | 3/2000 | Brunson et al. |
| 6,058,175 A | 5/2000 | Schultz |
| 6,058,178 A | 5/2000 | McKendry et al. |
| 6,097,802 A | 8/2000 | Fleischer, III et al. |
| 6,104,799 A | 8/2000 | Jain et al. |
| 6,115,040 A | 9/2000 | Bladow et al. |
| 6,118,780 A | 9/2000 | Dunn et al. |
| 6,125,126 A | 9/2000 | Hallenstal |
| 6,134,310 A | 10/2000 | Swan et al. |
| 6,160,877 A | 12/2000 | Tatchell et al. |
| 6,161,128 A | 12/2000 | Smyk |
| 6,167,122 A | 12/2000 | Titmuss et al. |
| 6,173,437 B1 | 1/2001 | Polcyn |
| 6,192,118 B1 | 2/2001 | Bayless et al. |
| 6,195,678 B1 | 2/2001 | Komuro |
| 6,195,697 B1 | 2/2001 | Bowman-Amuah |
| 6,212,561 B1 * | 4/2001 | Sitaraman et al. .......... 709/225 |
| 6,233,330 B1 | 5/2001 | McClure et al. |
| 6,240,441 B1 | 5/2001 | Beckett et al. |
| 6,246,751 B1 | 6/2001 | Bergl et al. |
| 6,246,756 B1 | 6/2001 | Borland et al. |
| 6,259,449 B1 | 7/2001 | Saxena et al. |
| 6,263,064 B1 | 7/2001 | O'Neal et al. |
| 6,304,641 B1 | 10/2001 | Culli et al. |
| 6,317,484 B1 | 11/2001 | McAllister |
| 6,320,948 B1 | 11/2001 | Heilmann et al. |
| 6,330,598 B1 | 12/2001 | Beckwith et al. |
| 6,337,899 B1 | 1/2002 | Alcendor et al. |
| 6,445,694 B1 | 9/2002 | Swartz |
| 6,453,164 B1 | 9/2002 | Fuller et al. |
| 6,456,706 B1 | 9/2002 | Blood et al. |
| 6,463,145 B1 | 10/2002 | O'Neal et al. |
| 6,529,596 B1 | 3/2003 | Asprey et al. |
| 6,549,619 B1 | 4/2003 | Bell et al. |
| 6,574,661 B1 | 6/2003 | Delano et al. |
| 6,584,444 B1 * | 6/2003 | Tello et al. ................... 705/1 |
| 6,631,186 B1 | 10/2003 | Adams et al. |
| 6,631,416 B2 * | 10/2003 | Bendinelli et al. .......... 709/227 |
| 6,640,239 B1 * | 10/2003 | Gidwani ..................... 709/203 |
| 6,662,221 B1 * | 12/2003 | Gonda et al. ............... 709/223 |
| 6,671,365 B2 | 12/2003 | Kemppainen |
| 6,678,827 B1 * | 1/2004 | Rothermel et al. ......... 709/223 |
| 6,728,238 B1 * | 4/2004 | Long et al. .................. 370/352 |
| 6,748,439 B1 * | 6/2004 | Monachello et al. ....... 709/229 |
| 6,931,115 B1 | 8/2005 | Okamura |
| 2001/0048738 A1 | 12/2001 | Baniak et al. |
| 2001/0049737 A1 * | 12/2001 | Carolan et al. ............. 709/229 |
| 2002/0054587 A1 | 5/2002 | Baniak et al. |
| 2002/0118671 A1 * | 8/2002 | Staples et al. .............. 370/352 |
| 2002/0168055 A1 | 11/2002 | Crockett et al. |
| 2003/0007621 A1 | 1/2003 | Graves et al. |
| 2003/0028650 A1 * | 2/2003 | Chen et al. .................. 709/229 |
| 2003/0076941 A1 | 4/2003 | Book et al. |
| 2003/0161459 A1 | 8/2003 | Book et al. |
| 2003/0200321 A1 * | 10/2003 | Chen et al. .................. 709/229 |
| 2004/0199624 A1 * | 10/2004 | Poisson et al. ............. 709/223 |
| 2004/0243708 A1 * | 12/2004 | Stebbings ................... 709/225 |
| 2005/0114794 A1 * | 5/2005 | Grimes et al. .............. 715/840 |

FOREIGN PATENT DOCUMENTS

| | | |
|---|---|---|
| EP | 0740480 | 10/1996 |
| WO | 92/09164 | 5/1992 |
| WO | 99/16230 | 4/1999 |
| WO | 99/20058 | 4/1999 |
| WO | 00/65857 | 11/2000 |
| WO | 01/35240 | 5/2001 |

OTHER PUBLICATIONS

Berman, Roger K., and Brewster, John H., "Perspectives on the AIN Architecture," IEEE Communications Magazine, Feb. 1992, pp. 27-32.

Advanced Intelligent Network (AIN) 0.1 Switching Systems Generic Requirements (Bellcore TR-NWT-001284), Issue 1, Aug. 1992.

Advanced Intelligent Network (AIN) 0.1 Switch-Service Control Point (SCP) Application Protocol Interface Generic Requirements (Bellcore TR-NWT-001285), Issue 1, Aug. 1992.

BT Technology Journal, vol. 13, No. 2. Apr. 1995, Ipswich GB. 132-142.

Internet web pages Dazil Internet Services, "Caller EyeDee," downloaded Dec. 2001.

Internet Web Pages by Z-Tel, "Personal Communications Center", dated Apr. 13, 2000 and May 15, 2000.

Internet Web Pages by TOSC International, "Cool Call", dated May 4, 2000.

Internet Web Pages by Phone.Com, "My Phone Services"., dated May 4, 2000.

Lennox et al., "Call processing Language Framework and Requirements", RFC 2824, published May 2000.

Lennox et al., "CPL: A Language for User Control of Internet Telephony Services", Internet Engineering Task Force, IPTEL WG, published Oct. 25, 2000.

J. Rosenberg, "Introduction to CPL", Dynamicsoft, Winter 2001 Von Developers Conference, published Feb. 25, 2001.

"Next Generation Phone System", Internet web pages by CommWeb.com, Aug. 2, 2001.

"Teleglobe International Toll Free Services," www.teleglobe.com (Dec. 2002); and "Sprint Wholesale Toll-Free Services," http://www.sprintbiz.com/wholesale/products/toll_free_services.pdf (Jan. 2001).

Kramer, T., "Standalone Call Accounting: The Hardware, The Software, And The Enterprise", Mar. 5, 2001, Communications Convergence.Com, <http://www.cconvergence.com/shared/article/showArticle.jhtml?articleId=871196&pgno=1>.

* cited by examiner

Connection Details for Prodigy Internet

Connected on: 05/11/2001 09:42:27
Connection Time: 0:06:21:57

Data Transfer Rates
Send: 0 MBits/sec .384
Received: 0 MBits/sec 1.5

Data Transferred
2.67 Mbytes
Reset

Lost packets
0% 100%

Connection Health
Computer → Modem → DSL Line → Prodigy Services → Internet
Prodigy Email Status
Troubleshoot

| Description | Value |
|---|---|
| Protocol | PPPoE |
| IP Address | 64.218.162.122 |
| Encryption | None |
| DNS Primary | 151.164.1.7 |
| DNS Secondary | 151.164.1.8 |
| NBNS Primary | 0.0.0.0 |
| NBNS Secondary | 0.0.0.0 |
| Protocols | IP |
| SecurID | Disabled |
| Access Concentrator | 62021080075392-rback1.... |

Close

FIG. 11

UNIFIED INTERFACE FOR MANAGING DSL SERVICES

BACKGROUND OF THE INVENTION

1. Field of the Invention

The present invention relates to the field of telecommunications. More particularly, the present invention relates to a graphical user interface (GUI) that allows a user to access, maintain, and troubleshoot services over a single digital subscriber line (DSL) through a unified interface.

2. Acronyms

The written description provided herein contains acronyms which refer to various telecommunications services, components and techniques, as well as features relating to the present invention. Although some of these acronyms are known, use of these acronyms is not strictly standardized in the art. For purposes of the written description herein, acronyms will be defined as follows:

Application Service Provider (ASP)
    Broadband Capabilities Gateway (BCG)
    Digital Subscriber Line (DSL)
    Graphical User Interface (GUI)
    Internet Service Provider (ISP)
    Multi-Application Service (MAS)
    Network Service Provider (NSP)
    Virtual Private Network (VPN)

3. Description of Background Information

Many telecommunications carriers offer DSL service to bring high-speed connectivity over ordinary copper telephone lines (twisted pair) to homes and businesses. With DSL, digital data is transmitted to a computer without converting the data into analog and then back to digital, which permits a much wider to be employed. Additionally, the signal can be separated so that some of the data is used to transmit an analog signal, allowing the telephone and computer to be used simultaneously. With DSL Internet service, subscribers can browse the Internet, connect to a corporate network via a virtual private network (VPN), play games, listen to music, stream videos, or watch movies. A DSL Internet service connection permits the sharing of the DSL with other personal computers (PCS) in the same home or office. Today, many homes have DSL service so that the subscribers can access a corporate LAN at their place of employment via a VPN.

A VPN is a private data network that makes use of the public Internet, while maintaining security through the use of a tunneling protocol. Essentially, data traffic destined for a remote location is first encapsulated and encrypted prior to being transmitted over the Internet to the remote site. For end users, it appears to be a single private network; however, the public Internet is employed to securely transport data traffic between destinations. The idea behind the VPN is to give companies the same capabilities as with a private network, but at a much lower cost.

DSL subscribers may also access the Internet by a conventional Internet Service Provider (ISP), giving the subscribers a range of options. It would be desirable to have a unified user interface permitting the subscriber to manage multiple types of Internet connections and services.

Typically, user interfaces require multiple applications or screens to manage connectivity and service selection processes. Implementations that involve multiple applications impose greater cognitive demands upon the user, increasing the likelihood of making errors. For instance, a user may not know which application to access to perform a certain function. Confusion on the part of the user may lead to attempting to use the wrong application to perform a specified function. Further, a user may not be aware of available functions on some of the more infrequently accessed applications. Thus, a user is likely to build an erroneous mental model that does not match the family of available applications. All of these factors induce customer frustration and dissatisfaction. As a result, customers may be less likely to use the service. This may also result in an increase in calls to a customer help desk. Moreover, in some instances a technician may have to be dispatched to the customer's location.

It would be desirable to have a unified interface that integrates access, maintenance, and troubleshooting functionality for a variety of connections and services. The present invention overcomes the problems associated with the prior art.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which:

FIG. 11 illustrates an exemplary details screen, according to an aspect of the present invention.

DETAILED DESCRIPTION OF THE EMBODIMENTS

Figure 1:
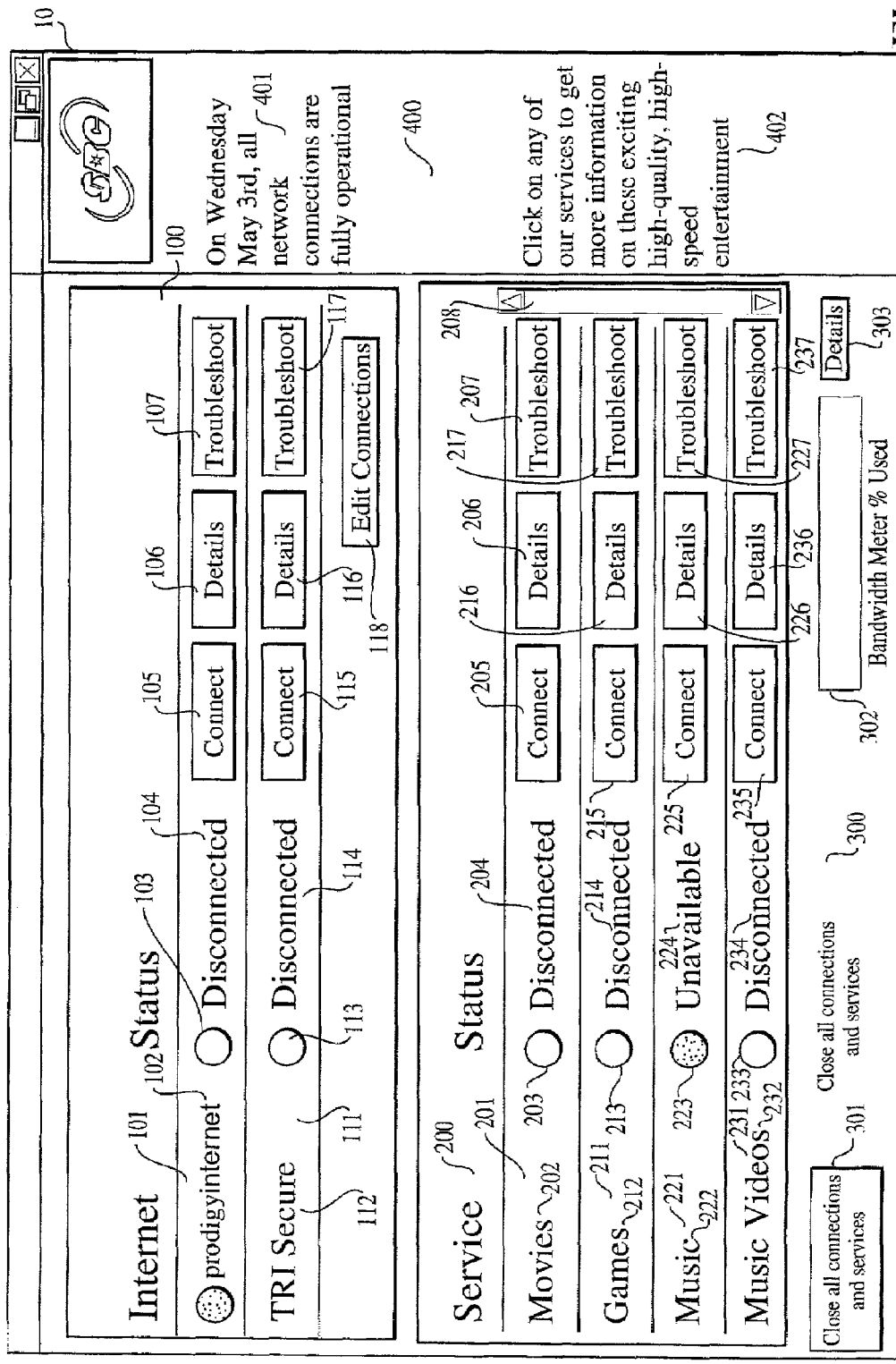
FIG. 1 illustrates an exemplary main user interface of the initial screen of the present invention.

In view of the foregoing, the present invention, through one or more of its various aspects and/or embodiments is thus presented to provide an interface that allows a subscriber to access, maintain, and troubleshoot services over a single DSL line through a unified interface.

Accordingly, one aspect of the invention is to provide a method for managing multiple connections and services associated with DSL service from a unified interface. The method includes providing a subscriber with access to multiple Internet connections and services over a DSL, in which the multiple Internet connections and services are visually represented on a single graphical user interface of a subscriber's display. The method also includes receiving at least one connection request from the subscriber to connect to the Internet via at least one of the multiple internet connections and connecting the subscriber to the at least one of the multiple internet connections in response to the subscriber's at least one connection request.

The method may include receiving at least one service request from the subscriber to connect to one or more services and connecting the subscriber to the at least one service in response to the subscriber's at least one service request. The method may also include displaying at least one Internet service window that is devoid of navigational controls. At least one of the services may be associated with a movie service, a games service, a music service, and/or a music video service. One of the multiple connections may be associated with a non-secure ISP and/or a secure VPN.

Another aspect of the present invention is to provide a method for accessing and managing DSL services via a graphical user interface. The method includes receiving from a DSL subscriber a first request to connect to the Internet via a non-secure ISP or a secure VPN and connecting the subscriber with the Internet in response to receiving the subscriber's first request. The method further includes receiving from the subscriber a second request to connect to at least one of a plurality of Internet services and connecting the subscriber with the at least one Internet service in response to the subscriber's second request.

The method may also include displaying at least one Internet service window that is devoid of navigational controls. Further, the method may include prohibiting the subscriber from being simultaneously connected to a non-secure ISP and a secure VPN.

Another aspect of the invention is to provide a method for accessing and managing DSL services via a graphical user interface. The method includes receiving from a DSL subscriber a request to connect to the Internet via a non-secure ISP and connecting the subscriber with the Internet via a non-secure ISP in response to receiving the subscriber's request to connect to the Internet via the non-secure ISP. The method further includes receiving from the DSL subscriber a request to connect to the Internet via a secure VPN and connecting the subscriber with the Internet via a secure VPN in response to receiving the subscriber's request to connect to the Internet via the secure VPN. As a result, the subscriber is simultaneously connected to the Internet via a non-secure Internet connection and a secure VPN connection over a single DSL.

The method may include receiving from the subscriber a request to connect to at least one of a plurality of Internet services and connecting the subscriber with at least one Internet service in response to the subscriber's request. The method may also include displaying at least one Internet service window that is devoid of navigational controls.

Another aspect of the invention is to provide a computer readable medium for storing a computer program that facilitates the management of multiple Internet connections and services. The computer readable medium includes a presenting source code segment that presents a graphical user interface to the subscriber including a connections pane and a services pane, in which each pane contains visual representations associated with Internet connections and services. The computer readable medium also includes a receiving source code segment that receives at least one selection from the subscriber and a connecting source code segment that connects the subscriber with the Internet connection and/or service in accordance with the subscriber's selection.

The computer readable medium may include a presenting source code segment that presents an operations pane having functions associated with bandwidth and connection details. The presenting source code segment may present a message pane that displays messages associated with the Internet connections and services. The presenting source code segment may also present a visual representation associated with a non-secure ISP Internet connection and/or a secure VPN Internet connection.

Further, the presenting source code segment may present a visual representation associated with a movies service, games service, music service, and/or music videos service. The connecting source code segment may prohibit the subscriber from being simultaneously connected to the Internet via a non-secure ISP and a secure VPN.

The user interface of the present invention is a GUI that is resident on a subscriber's personal computer and may be opened via an icon on the subscriber's desktop or in the subscriber's tool tray. Since DSL provides a dedicated line that is instantly available to its subscribers, the user interface has the functionality of a one time initial DSL log in. Thereafter, any required DSL authentication and authorization would be transparent to the subscriber. Although, the subscriber has the option of enabling authentication and authorization if desired.

The user interface of the present invention interacts with a backend component that manages an array of network infrastructure elements involved in delivering DSL service to subscribers. The user interface integrates a broadband capabilities gateway (BCG), which enables multi-application service (MAS) functionality. MAS functionality allows simultaneous delivery of multiple connections and services over a DSL through a network layer, i.e., the BCG. MAS provides flexibility for the subscriber to connect to an NSP, ISP, multiple ISPs, or a corporate local area network. For subscribers connected to an ISP, the MAS service provides the possibility of tunneling to other ISPs or network services. Essentially, the subscriber is permitted via the interface to make and manage multiple simultaneous connections over a single DSL. The user interface contains visual representations of various Internet connections and services that are available to the subscriber, and that may be selected at the subscriber's discretion.

The interface of the present invention supports any operating system, including for example, Windows 95, 98, 2000, ME, NT, and XP as well as Macintosh, LINUX, and UNIX based operating systems. Although the user interface is preferably accessed via personal computer, other devices such as a home gateway device, a set top box in conjunction with a television monitor, mobile computing device, computer tablet, smart remote, or other electronic device such as a wireless type home device may be employed.

FIG. 1 illustrates an exemplary main user interface 10 of the present invention. The interface includes four primary components or panes that will now be discussed. Component 100 controls access to the subscriber's Internet based connections. The subscriber uses component 100 to connect to the Internet and perform various functions such as troubleshooting and viewing the details of the Internet connections. As shown in the example of FIG. 1, the subscriber's available Internet based connections include a conventional commercial non-secure ISP, such as Prodigy, and a dedicated secure VPN connection to, for example, a corporate LAN at the subscriber's place of employment.

Additional IP based connections comprising conventional non-secure ISPs and/or secure VPNs could be accommodated, if desired by the subscriber. In the event that more than two IP based connections are available to a subscriber, a scroll bar or drop down menu may be incorporated into the interface so that the full list of available Internet connections may be reviewed, enabling the selection of at least one connection. For example, a household with two working adults may require two secure VPN connections so that each adult may connect to a corporate LAN at their respective places of employment. Further, the same household would likely have at least one conventional non-secure ISP Internet connection for personal and other non-employment related Internet activities.

Internet connection row 101 is associated with a conventional non-secure ISP connection and includes an Internet connection identifier 102, status lamp 103, status indicator 104, connect button 105, details button 106, and troubleshoot button 107. Internet connection row 111 is associated with a secure VPN connection and includes Internet connection identifier 112, status lamp 113, status indicator 114, connect button 115, details button 116, and troubleshoot button 117. The user interface is capable of being customized by the subscriber in accordance with the subscriber's needs and with the various options offered by the DSL provider. For instance, an edit connections button 118 is also provided in component 100 for adding, deleting, or modifying Internet connection identifiers.

Status lamps 103, 113 become illuminated and status indicators read connected when the corresponding Internet connection is active. Similarly, status indicators 104, 114 may also signify whether a corresponding Internet connection is disconnected or unavailable, depending upon its current status. Connect buttons 105, 115 may be selected by the subscriber to initiate a connection to the Internet via a conventional non-secure ISP or secure VPN, respectively. Details buttons 106, 116 may be selected by the subscriber in regards to a corresponding Internet connection to display details on the subscriber's monitor concerning information such as connection time, data transfer rates, data transferred per session, and lost packet information. Further information concerning the details function will be discussed herein later.

Troubleshoot buttons 107, 117 may be selected by the subscriber to identify the nature of a pending problem with respect to a corresponding Internet connection, which will be provided to the subscriber on the subscriber's display. Also, selecting troubleshoot buttons 107, 117 prompts a display of possible corrective actions that may be undertaken by the subscriber to fix the problem. Internet connection rows 101, 111 become illuminated or backlit when the cursor is moved over the respective rows and the subscriber is in the process of selecting that particular connection method.

Component 200 controls all of the Internet service offerings available to the subscriber, including for example, movies, games, music, and music videos. The list of services is specific to what is actually available to a particular subscriber. Further, the subscriber may add or delete Internet services as necessary, as well as alter the manner and order in which the services are displayed. The list of Internet services may include services offered by the subscriber's DSL provider or third party application service providers (ASPs). The realm of Internet services that may be used with the interface is not limited to those services depicted in FIG. 1. In fact, other Internet services that may be incorporated in component 200 include services associated with data backup, application delivery, virus and security protection, and vendor specific database access.

Internet service row 201 is associated with a movies service and includes a service identifier 202, status lamp 203, status indicator 204, connect button 205, details button 206, and troubleshoot button 207. A scroll bar 208 is provided so that the full list of Internet services may be reviewed, facilitating the selection of at least one service for an active connection. Internet service row 211 is associated with a games service and includes a service identifier 212, status lamp 213, status indicator 214, connect button 215, details button 216, and troubleshoot button 217. Internet service row 221 is associated with a music service and includes a service identifier 222, status lamp 223, status indicator 224, connect button 225, details button 226, and troubleshoot button 227. As shown, the music service is unavailable as evidenced by the status lamp 223 being illuminated and the unavailable indication on status indicator 224. Further, connect button 225 for the music service is non-active, another indication that the music service is unavailable. Internet service row 231 is associated with a music videos service and includes a service identifier 232, status lamp 233, status indicator 234, connect button 235, details button 236, and troubleshoot button 237.

Status lamps 203, 213, 223, 233 become illuminated and status indicators 204, 214, 224, 234 read connected when the corresponding Internet service is connected, or active. Status lamps 203, 213, 223, 233 may be color coded such that different color lights are provided for each of the various different Internet services. Connect buttons 205, 215, 225, 235 may be selected by the subscriber to connect to, or activate a corresponding Internet service. Details buttons 206, 216, 226, 236 may be selected by a subscriber in regards to a corresponding Internet service to display on the subscriber's monitor details concerning, e.g., connection time, data transfer rates, data transferred per session, and the lost packet information. Troubleshoot buttons 207, 217, 227, 237 may be selected by the subscriber to identify the nature of a pending problem with respect to a corresponding Internet service, which is provided to the subscriber on the subscriber's display. Also, selecting troubleshoot buttons 207, 217, 227, 237 prompts a display of possible corrective actions that may be undertaken by the subscriber to fix the problem. Internet service rows 201, 211, 221, 231 become illuminated or backlit when the cursor is moved over the respective rows and the subscriber is in the process of selecting that particular Internet service.

Component 300 contains global information and operational elements, including functions to monitor bandwidth and connection details. A close all connections and services button 301 provides a subscriber with a manner to quickly terminate all of the IP based connections and Internet services. A bandwidth meter 302 provides the subscriber with an indication of the total bandwidth being occupied on the DSL. As will be discussed later, the bandwidth meter 302 indicates the combined bandwidth utilized by all of the computers connected via the same DSL. A details button 303 is also incorporated in component 300, the functionality of which will be discussed later.

Component 400 contains dynamic information 401 about the health of the DSL connection and information regarding the various Internet services available to the subscriber including advertisements and prompts 402. The content of component 400 may be textual, graphical, video and/or audio. For example, one message may indicate that all of the network operations are fully operational. Another message may prompt the subscriber to select a movies service and provide the price of such subscription, or offer contest information. The prompts advise the subscriber to click on a button associated with a particular advertisement.

Figure 2:
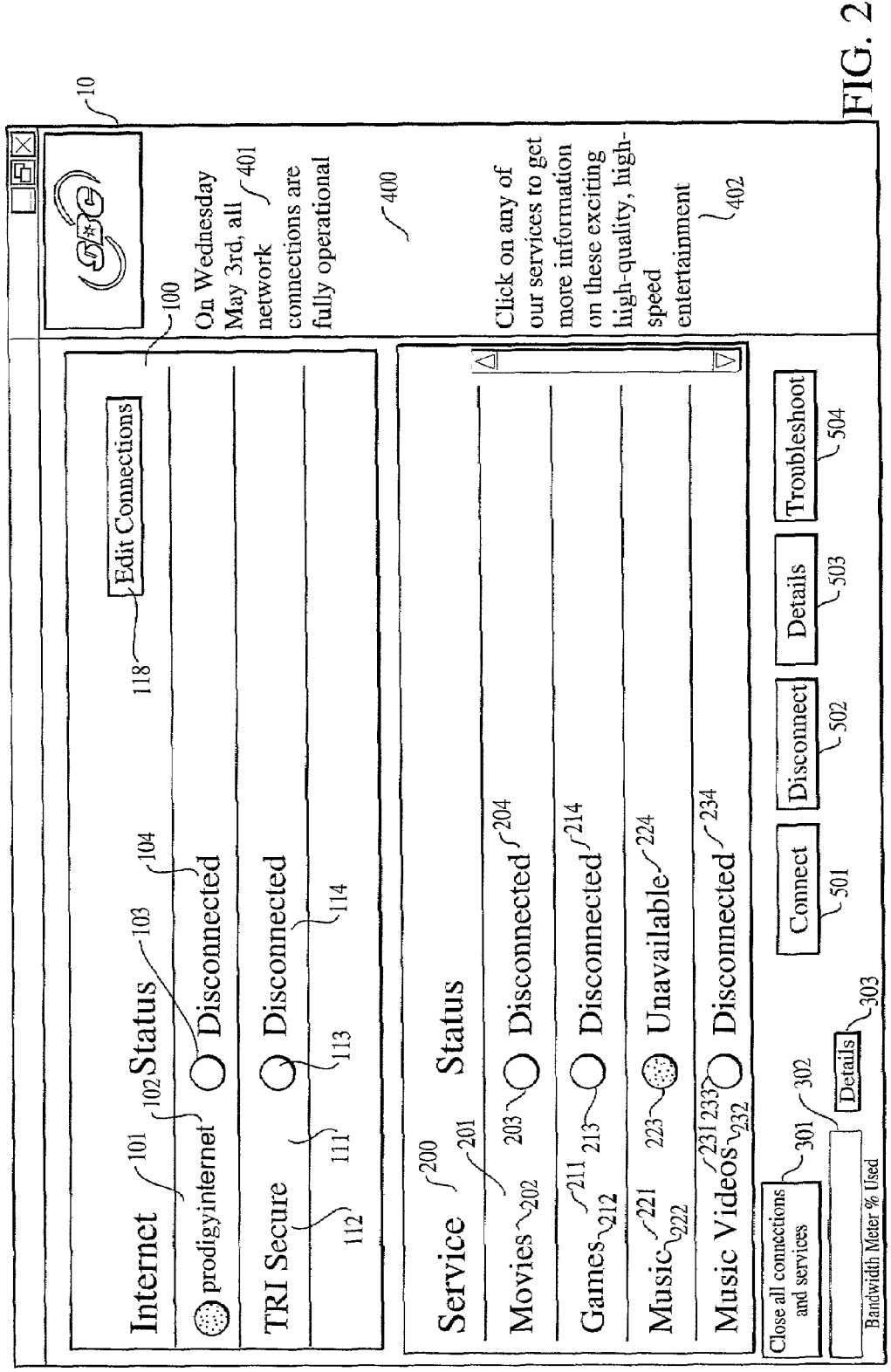
FIG. 2 illustrates an alternative exemplary initial screen of the main user interface of the present invention.

FIG. 2 illustrates an alternative exemplary main user interface 10 of the present invention. As shown, a connect button 501, disconnect button 502, details button 503, and troubleshoot button 504 perform the identical functions for all of the Internet connections and services explained in FIG. 1; however, buttons 501, 502, 503, 504 perform the function for each Internet connection and service, rather than having separate buttons for each selected Internet connection and service.

Figure 3:
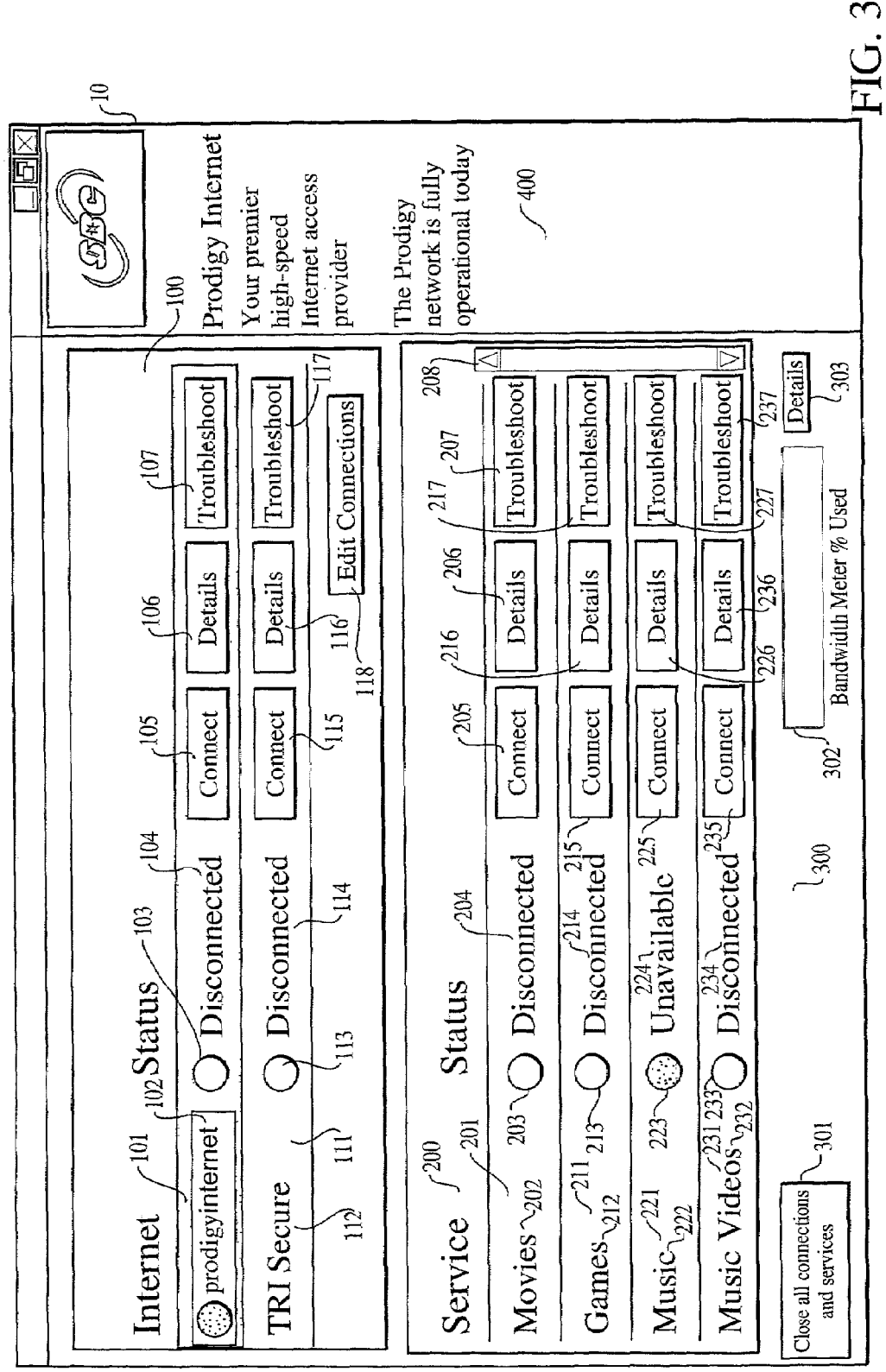
FIG. 3 illustrates an exemplary main user interface of the present invention in which a subscriber selects to connect to the Internet via a conventional non-secure ISP.

FIG. 3 shows an exemplary main user interface 10 of the of the present invention in which a subscriber selects to connect to the Internet via a conventional non-secure ISP. As shown, Internet connection row 101 is illuminated, indicating that the subscriber is preparing to select a conventional non-secure ISP Internet connection. As the subscriber prepares to connect, the status of the connection appears in component 400, including the name of the ISP selected and an indication of whether the network is fully operational. Once the subscriber selects the connect button 105 for the conventional non-secure ISP connection, a password box associated with the ISP is displayed prompting the subscriber to enter a user name and password. However, if the service of the ISP selected by the subscriber does not require a user name and password, then this box will not be displayed. After a successful connection is made to the conventional non-secure ISP Internet connection, status lamp 103 will be illuminated and status indicator 104 will read connected. Once the conventional non-secure ISP connection is complete, a new browser window is opened and the home page for that particular connection is displayed, as will be discussed with respect to FIG. 4.

Figure 4:
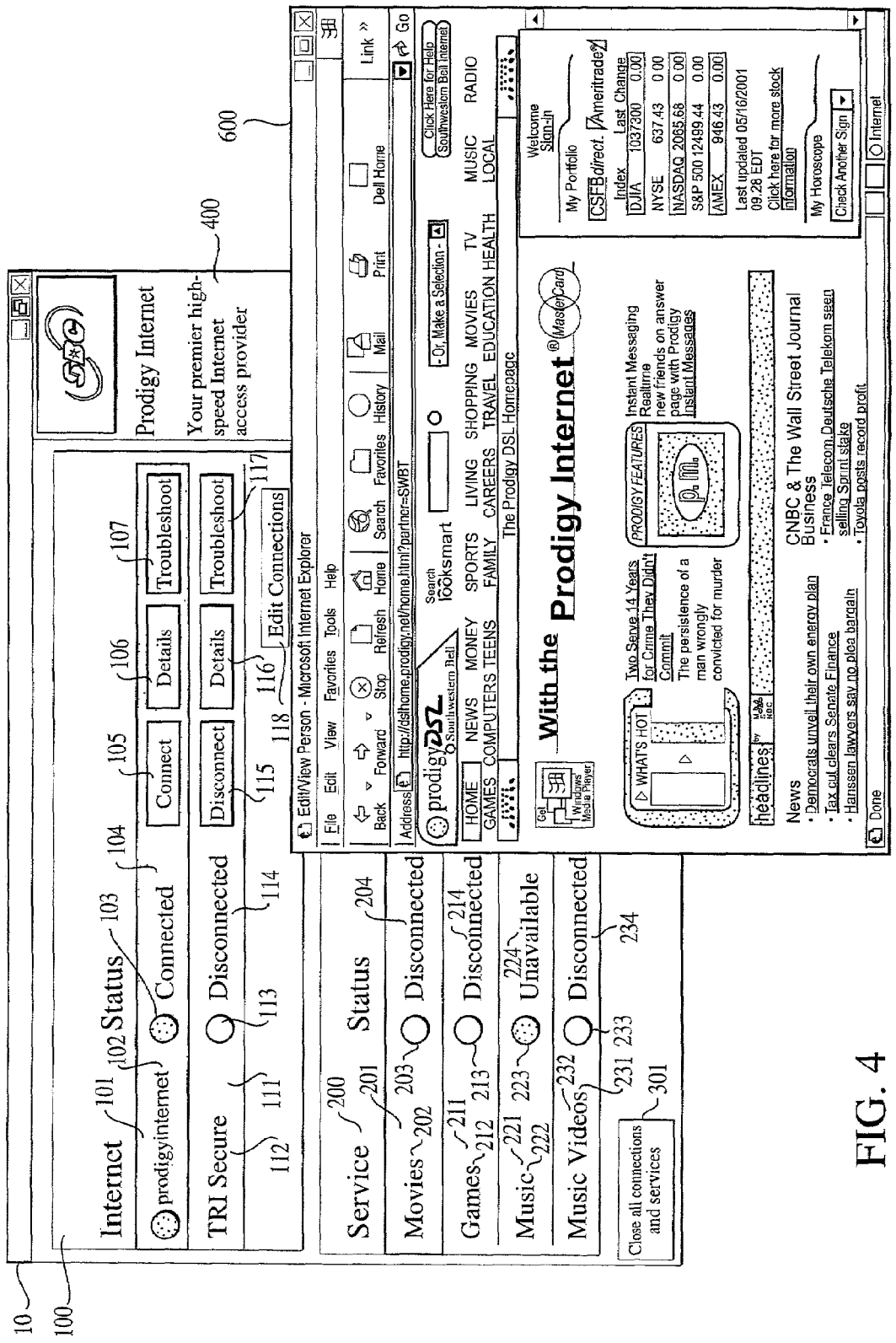
FIG. 4 illustrates an exemplary web page displayed when a subscriber is connected to the Internet via a conventional non-secure ISP.

FIG. 4 shows an exemplary web page of a subscriber connected to the Internet via a conventional non-secure ISP. As shown, the browser 600 associated with the subscriber's non-secure ISP connection has been launched in the foreground, while the subscriber's user interface 10 moves to the background. While connected to the conventional non-secure ISP connection, the subscriber may also connect to another non-secure ISP connection, to one or more secure VPN connections, or to any of the Internet services identified in component 200.

Figure 5:
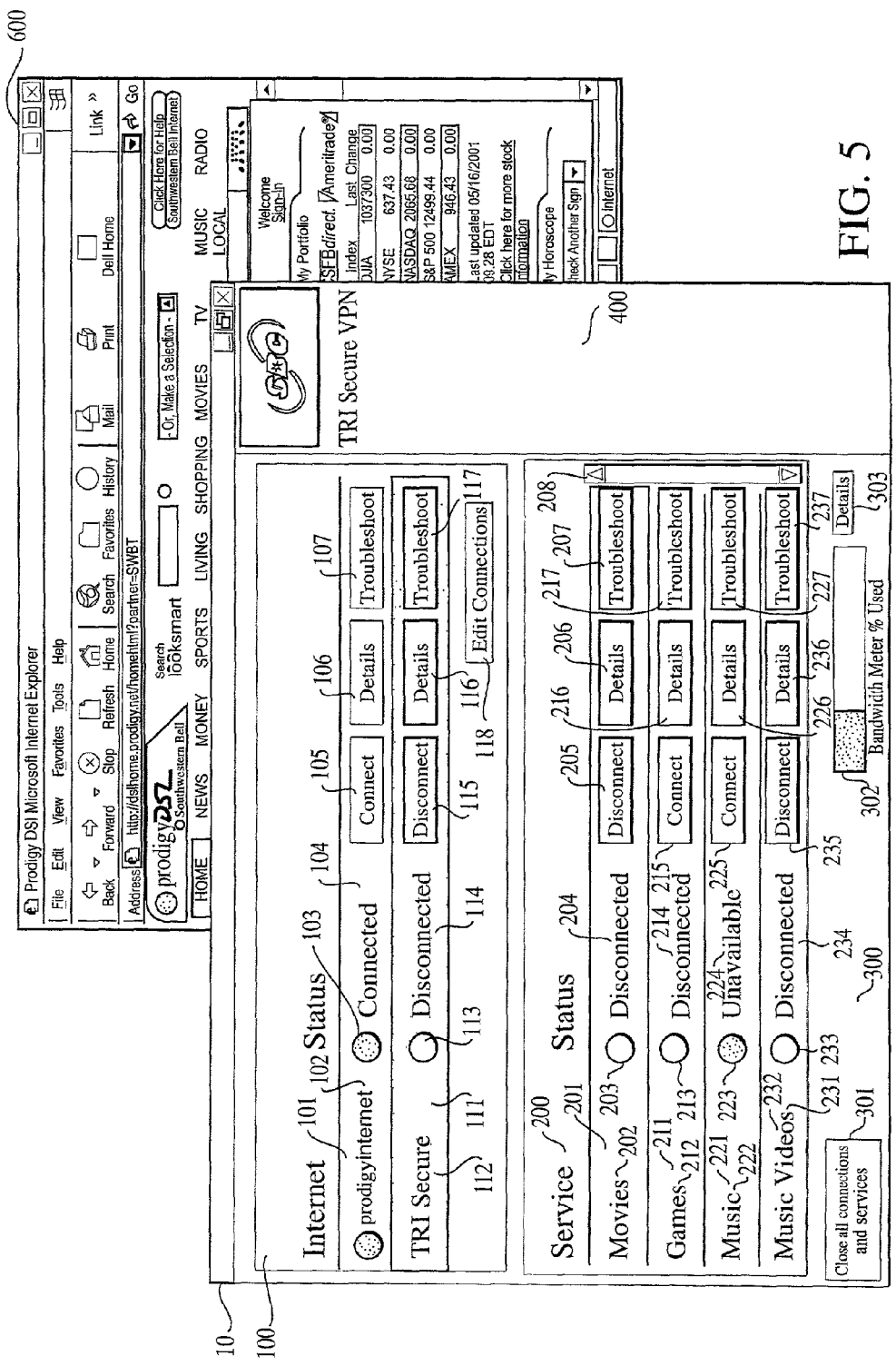
FIG. 5 illustrates an exemplary main user interface of the present invention in which a subscriber selects to connect to the Internet via a secure VPN while being connected to the Internet via a conventional non-secure ISP.

FIG. 5 shows an exemplary main user interface 10 of the present invention in which a subscriber selects to connect to the Internet via a secure VPN while already being connected to the Internet via a conventional non-secure ISP. As the subscriber moves the cursor to the Internet connection identifier 112 associated with a secure VPN, Internet connection row 111 becomes illuminated. Also, an indication of the combined bandwidth currently occupied by the ISP connection appears on the bandwidth meter 302 located in component 300. In one embodiment, the network architecture may be configured so that only one active Internet connection is allowed at a given time. This may be desired so that the security of the secure VPN is not comprised by being simultaneously connected to both the conventional non-secure ISP connection and the secure VPN.

Figure 6:
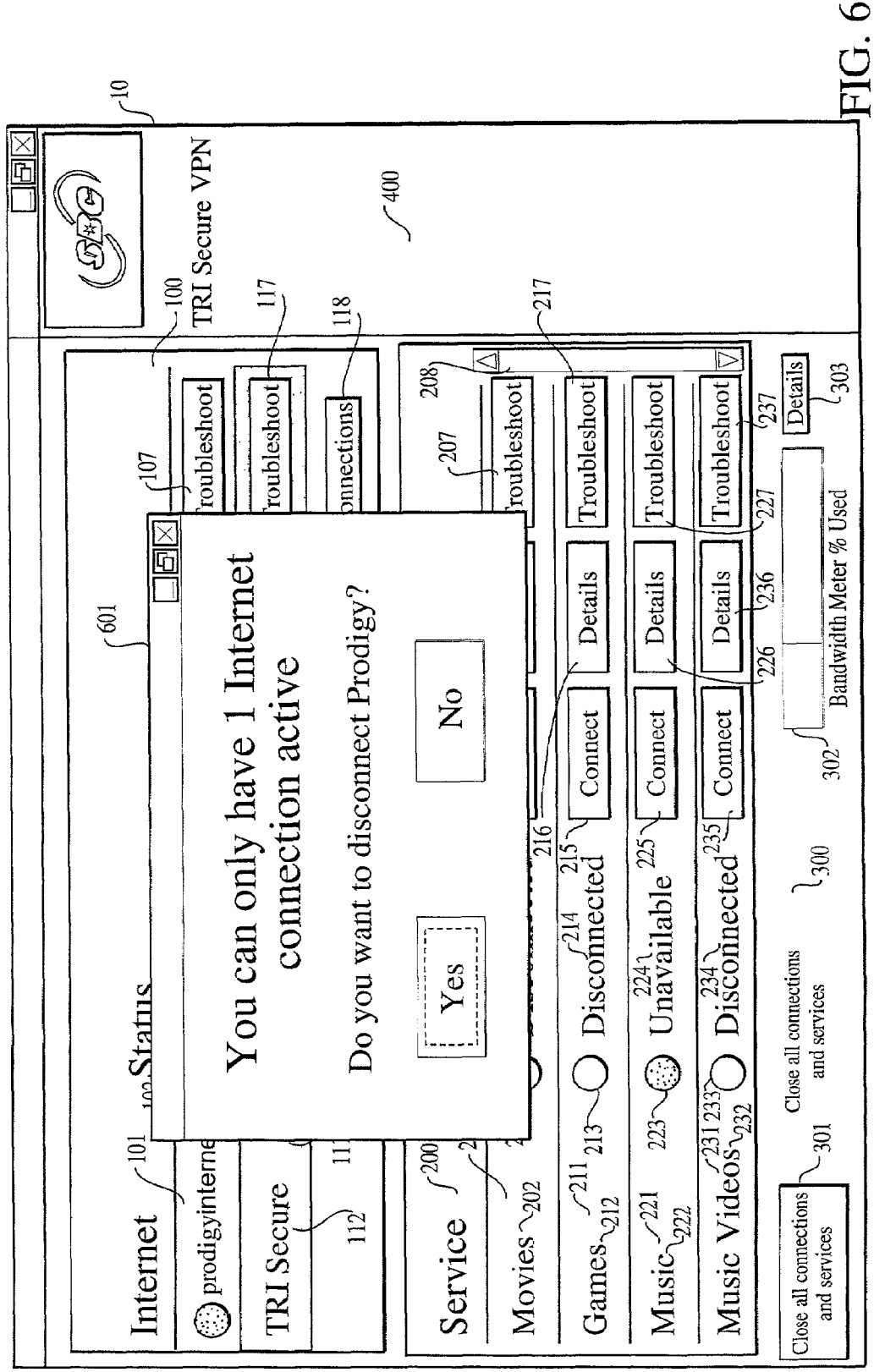
FIG. 6 illustrates an exemplary message box displayed when a subscriber selects to connect to the Internet via a secure VPN while being connected to the Internet via a conventional non-secure ISP.

FIG. 6 shows an exemplary main user interface 10 of the present invention with a message box 601 displayed when a subscriber selects to connect to the Internet via a secure VPN while already being connected to the Internet via a conventional non-secure ISP. As previously mentioned, a network may be configured so that only one active Internet connection is allowed at a given time so that the security of the secure VPN is not comprised by being simultaneously connected to both the conventional non-secure ISP connection and secure VPN. In this case, via message box 601 the subscriber is given the option to disconnect from the non-secure ISP connection and proceed with a connection via the secure VPN. In an alternative embodiment, other network configurations exist that allow simultaneous connections of the conventional non-secure ISP and secure VPN.

In any event, if the subscriber proceeds with an Internet connection via the secure VPN, a password box is displayed prompting the subscriber to enter a user name and password. Because the VPN is secure, the entry of a user name and password is required and may not be circumvented. However, a save password function may be incorporated into the password box so that the subscriber's password will not have to be entered during every connection to the Internet via the secure VPN. Once the connection to the Internet via the secure VPN is completed, a new browser window 700 is launched and the home page for that particular connection is displayed in the foreground as shown in FIG. 7.

Figure 7:
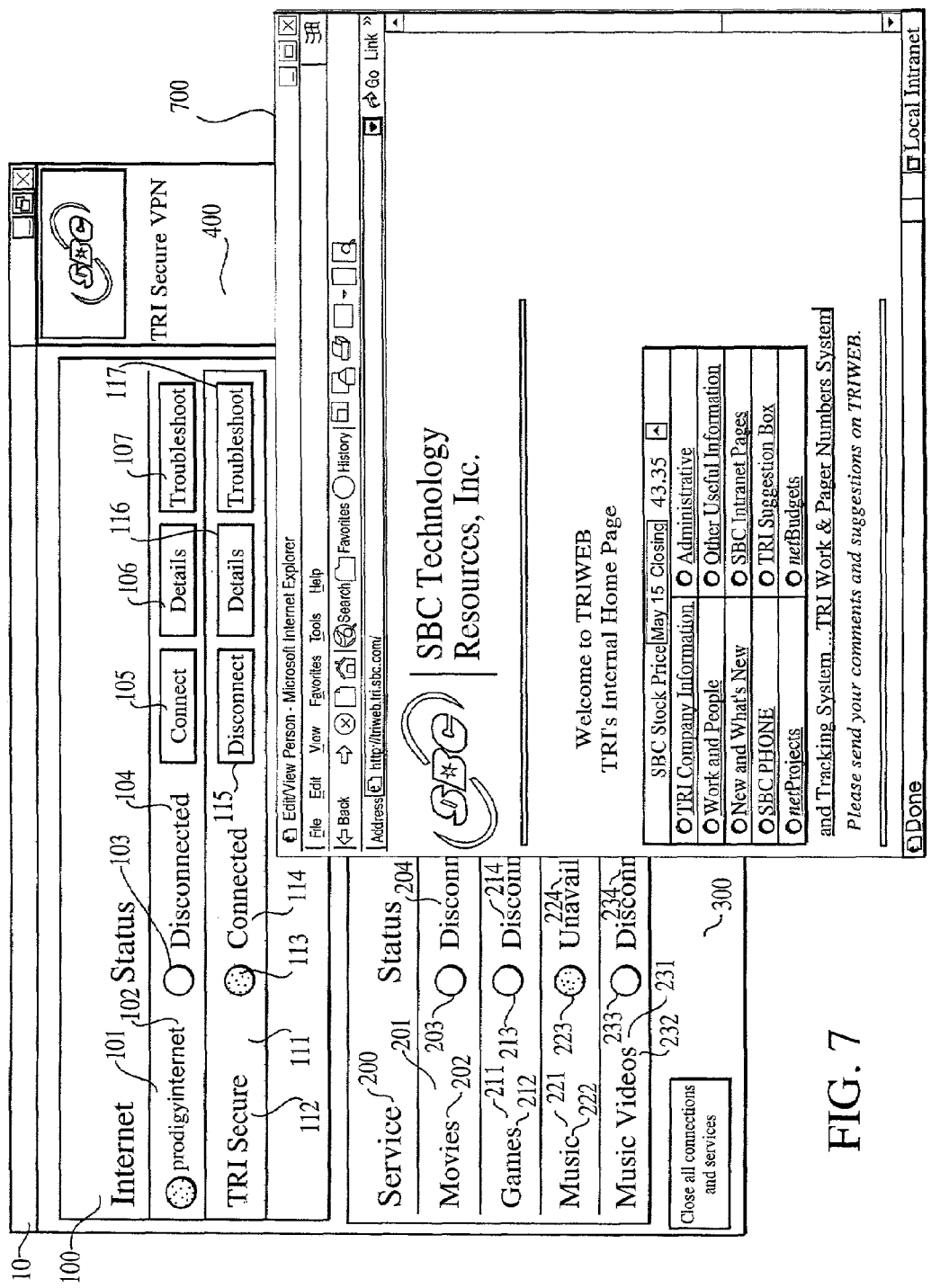
FIG. 7 illustrates an exemplary web page displayed when a subscriber is connected to the Internet via a secure VPN.

FIG. 7 shows an exemplary web page displayed when a subscriber is connected to the Internet via a secure VPN. As shown, the browser 700 associated with the subscriber's secure VPN connection has been launched in the foreground, while the subscriber's main user interface 10 moves to the background. While connected to the Internet via the secure VPN, a subscriber may also connect to the Internet via another secure VPN, to one or more non-secure ISP connections, or to any of the Internet services identified in component 200.

Figure 8:
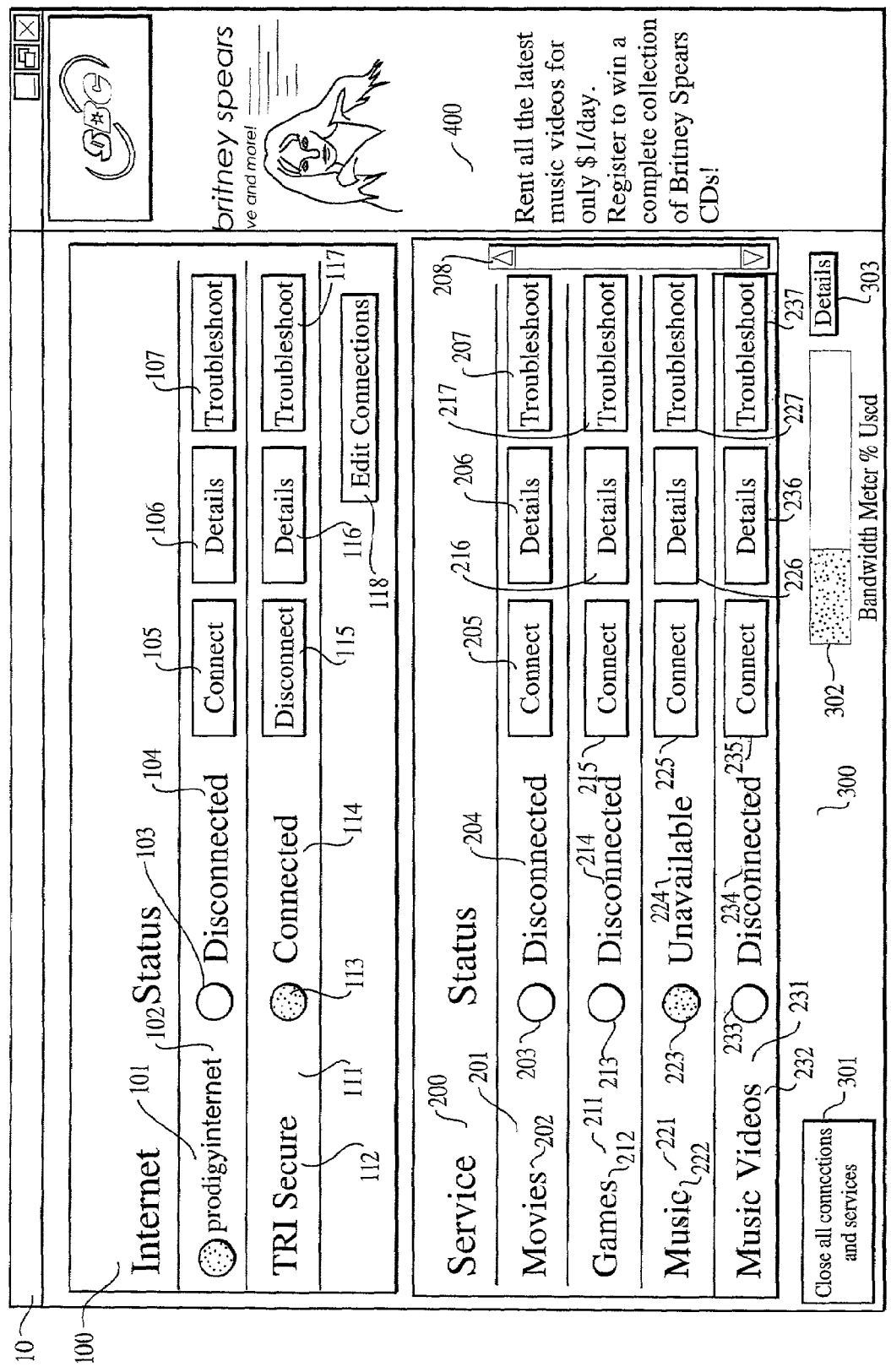
FIG. 8 illustrates an exemplary main user interface of the present invention in which a subscriber is connected to the Internet via a secure VPN and the subscriber selects to connect to a music videos service.

FIG. 8 shows an exemplary main user interface of the present invention in which a subscriber is connected to the Internet via a secure VPN and the subscriber desires to select a music videos service. As the cursor is moved over Internet service row 231 in component 200, information about the music videos service is displayed in component 400 and Internet service row 231 becomes illuminated. Once the subscriber selects the connect button 235 for the music videos service and the connection becomes active, status lamp 233 becomes illuminated and service indicator 234 changes to read connected. Further, a music application browser 56 is launched in the foreground as shown in FIG. 9.

Figure 9:
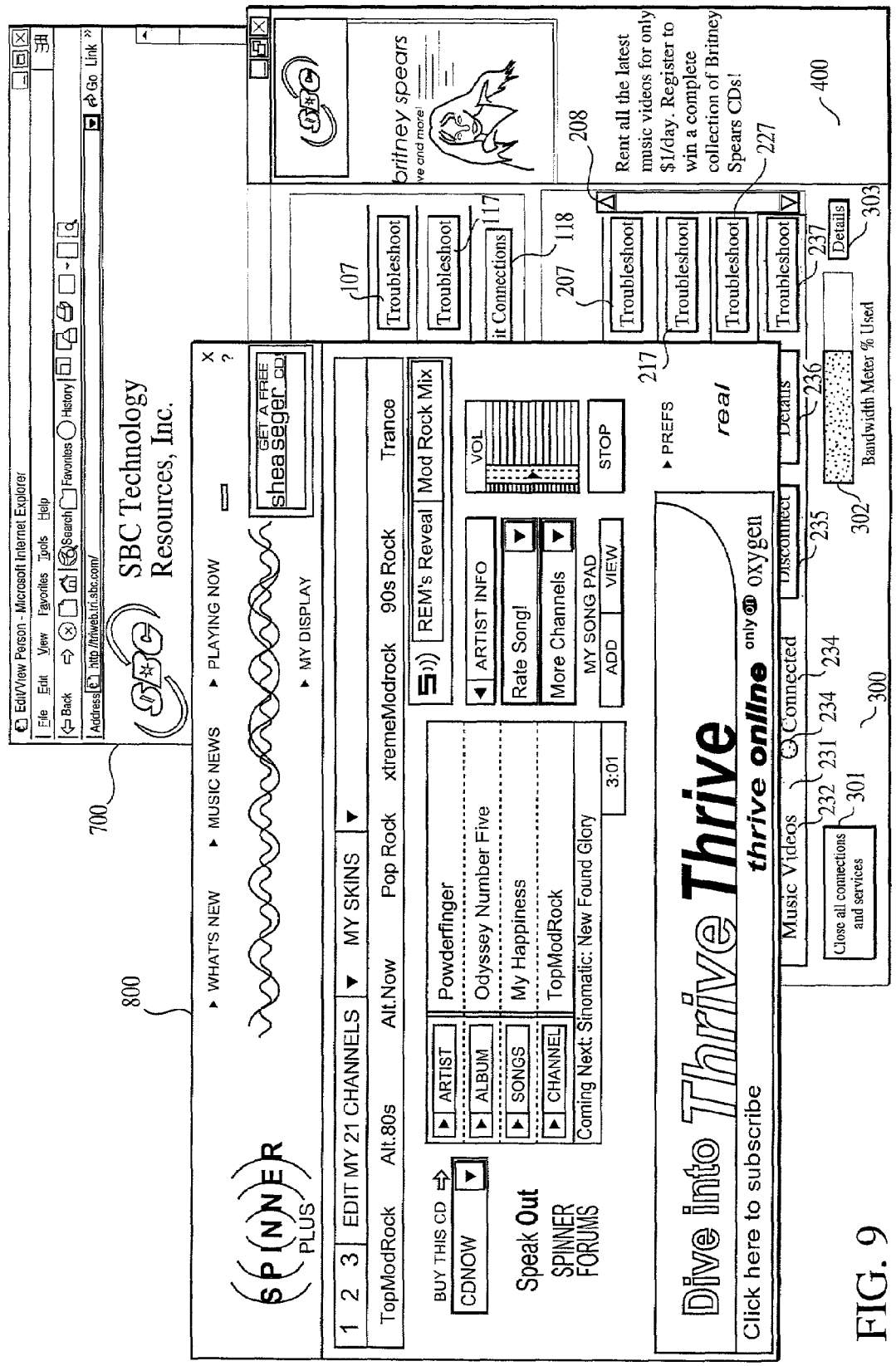
FIG. 9 illustrates an exemplary web page displayed when a subscriber is connected to a music videos service.

FIG. 9 shows an exemplary web page of a subscriber connected to a music videos service. As shown, a music videos window 800 is launched in the foreground and the main user interface 10 and secure VPN web page 700 are moved to the background. The secure VPN web page is still active; however, it has been relegated to the background. The bandwidth meter 302 in component 300 shows that additional bandwidth is being occupied, since multiple simultaneous services are open and active.

The music video application window 800 is devoid of any navigational controls (i.e., buttons for back, forward, stop, refresh, home, favorites, etc.) preventing the user from surfing to other sites, as is common with other windows launched as part of the interface. In this regard, the windows for the Internet services lack the navigational controls associated with typical browser windows, such as the browser windows launched for the Internet connections. The lack of navigational controls in the Internet services windows helps reduce error on the part of the subscriber and helps to differentiate between Internet services windows and Internet connection browser windows.

Figure 10:
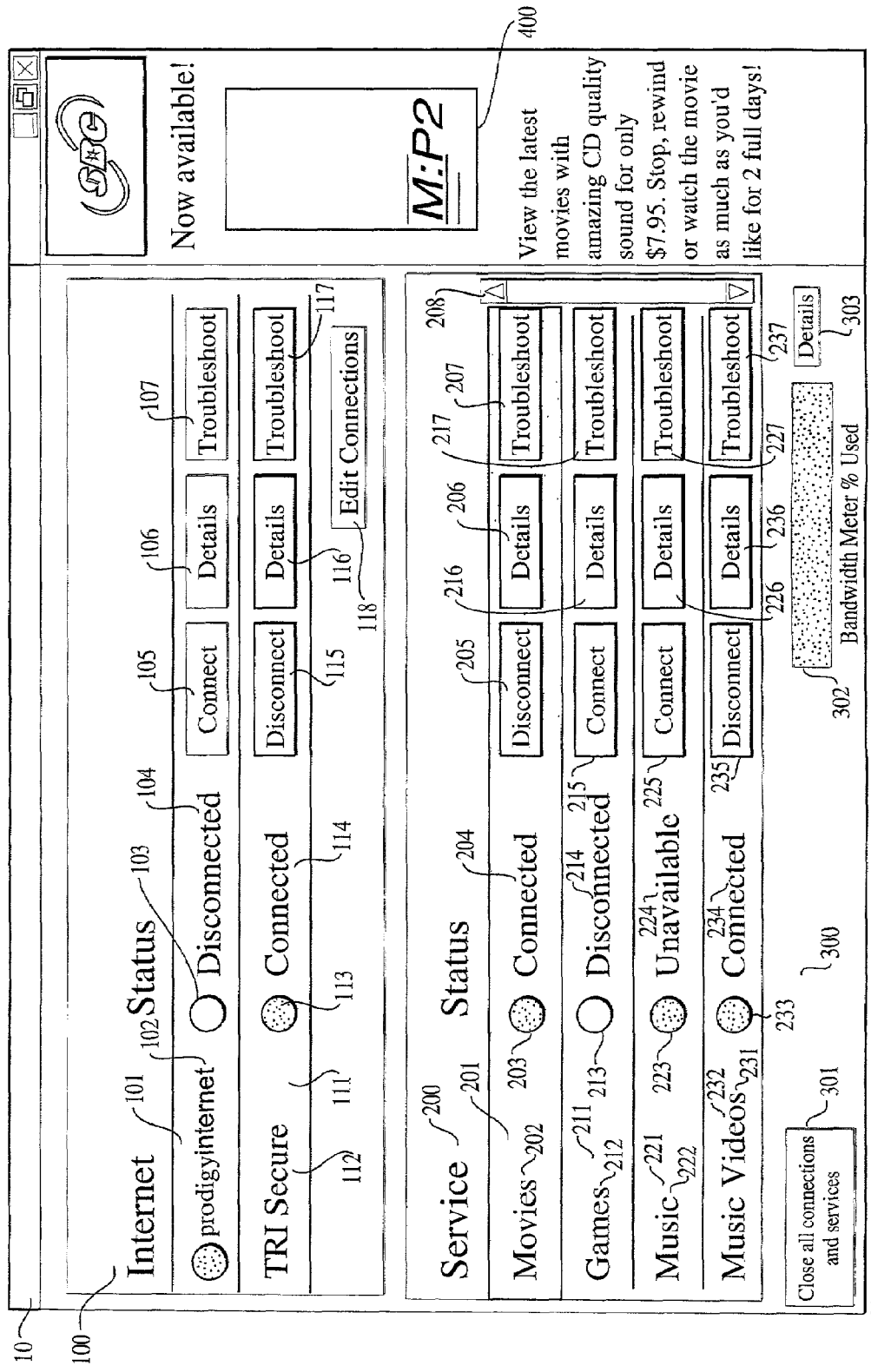
FIG. 10 illustrates an exemplary main user interface of the present invention in which a subscriber elects to connect to a movies service while being connected to a music videos service and to the Internet via a secure VPN.

FIG. 10 shows an exemplary main user interface of the present invention in which a subscriber is connected to a movies service while already being connected to a music videos service and to the Internet via a secure VPN. As shown, status lamps 113, 203, and 233 are all illuminated indicating active connections. Further in this regard, indicators 114, 204, and 234 all read connected. Additional services (e.g., music, games) may be accessed provided that there is available bandwidth.

In the event that a subscriber selects a service or services that in combination with other connections would exceed allotted bandwidth, a message box or pop-up window (not shown) is displayed to the subscriber. Alternatively, a message indicating this condition would appear in component 400. Further, the message would recommend a course of action to the subscriber, such as disconnecting one of the active services, thereby decreasing the amount of bandwidth currently being occupied.

Multiple Internet connections and/or services may be simultaneously accessed on different personal computers within a particular household. For instance, parents may watch one movie on their personal computer, while their children in the same home watch a different movie or watch music videos on a second personal computer. Similarly, a parent may access the Internet via secure VPN on one personal computer, while a child in the same home accesses the Internet via a non-secure ISP on a second personal computer. The user interface of the present invention is configured to keep track of the bandwidth utilized by all of the computers connected via the same DSL. This information is displayed in bandwidth meter 302. The status of the services and Internet connections, however, reflects the activity on the local personal computer only.

FIG. 11 shows an exemplary embodiment of a details screen 900 of the present invention. The left hand column 901 of the details screen shows details concerning connection time, data transfer rates for sending and receiving, the amount of data transferred within the particular session, and the number of lost packets. The connected on window 902 indicates the time and date on which the connection was made. The connection time window 903 indicates the duration of the current connection. The send window 904 indicates the data transfer rate for data sent in Mbps. The receive window 905 indicates the data transfer rate for data received in Mbps. A data transferred indicator 906 provides the amount of data transferred for a particular session or application. A reset button 907 is provided so that the subscriber may reset to zero the value in the data transferred indicator. A lost packet indicator 908 is color coded and indicates normal and/or error conditions.

The right hand column 909 of the details screen shows a basic model of the network from the computer through the Internet. The connection health indicator is color coded, providing an indication of the health of each element of the network. The network elements are located in a horizontal row and include a computer 911, modem 912, DSL line 913, ISP server 914, and Internet 915. Ancillary services such as E-mail 916 are also shown. A status window 910 is provided to show details about one of the network elements should a undesirable condition arise.

A troubleshooting button 917 is provided, which upon selection by the subscriber, displays the nature of the problem and the recommended course of corrective action. However, if the problem can be corrected automatically, the program does so without intervention on the part of the subscriber. An advanced information box 918 is provided to display a description and value of various parameters including, e.g., IP Address, DNS Primary, etc. Information contained in the box 918 may be required by persons interested in utilizing advanced services.

Further, the system also allows an individualized custom interface, e.g., parent's view, children's view, etc. For instance, an option in a pull down menu or a toggle may be provided so that various customized interfaces may be provided. In this regard, parents may elect to customize an interface for their children that may, for example, omit the games services. Additionally, a password may be required to change the interface.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to E-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards represent examples of the state of the art. Such standards are periodically superseded by faster or more efficient equivalents having essentially the same functions. Accordingly, replacement standards and protocols having the same functions are considered equivalents.

What is claimed is:

1. A method of providing access to and management of DSL services via a graphical user interface, the method comprising:

displaying the graphical user interface, the graphical user interface having a first pane for display of Internet connection identifiers, a second pane for display of Internet service identifiers, a third pane for display of bandwidth and connection information, and a fourth pane for display of network status and network provider messages;

receiving, from a user of DSL services, a first request to connect to the Internet via a non-secure ISP, the user having indicated the first request in the first pane of the graphical user interface;

connecting the user with the Internet in response to receiving the user's first request;

receiving, from the user, a second request to connect to at least one of a plurality of Internet services, the user having indicated the second request in the second pane of the graphical user interface;

connecting the user with the at least one Internet service in response to the users second request;

receiving, from the user, a third request to connect to the Internet via a secure VPN, the user having indicated the third request in the first pane of the graphical user interface; and connecting the user with the Internet via the secure VPN in response to receiving the user's third request, wherein the user is simultaneously connected to the Internet via the non-secure ISP connection and the secure VPN connection over a single DSL.

2. The method according to claim 1, further comprising displaying at least one Internet service window devoid of navigational controls.

3. The method according to claim 1, wherein one of the plurality of Internet services comprises a movie service.

4. The method according to claim 1, wherein one of the plurality of Internet services comprises a game service.

5. The method according to claim 1, wherein one of the plurality of Internet services comprises a music service.

6. The method according to claim 1, wherein one of the plurality of Internet services comprises a music video service.

7. The method according to claim 1, wherein connecting the user with the at least one Internet service is distinct from connecting the user with the Internet.

8. The method according to claim 1, wherein the user is prohibited from being simultaneously connected to the non-secure ISP and the secure VPN.

9. The method according to claim 1, further comprising prompting the user, connected to the non-secure ISP, with an option of disconnecting from the non-secure ISP in response to the third request from the user to connect to the Internet via the secure VPN, the prompting including an indication as to a current Internet connection status of the user.

10. A method of providing access to and management of DSL services via a graphical user interface, the method comprising:

displaying the graphical user interface, the graphical user interface having a first pane for display of Internet connection identifiers, a second pane for display of Internet service identifiers, a third pane for display of bandwidth and connection information, and a fourth pane for display of network status and network provider messages;

receiving, from a user of DSL services, a request to connect to the Internet via a non-secure ISP, the user having indicated the request to connect to the Internet via the non-secure ISP in the first pane of the graphical user interface;

connecting the user with the Internet via the non-secure ISP in response to receiving the user's request to connect to the Internet via the non-secure ISP;

receiving, from the user, a request to connect to the Internet via a secure VPN, the user having indicated the request to connect to the Internet via the secure VPN in the first pane of the graphical user interface; and connecting the user with the Internet via the secure VPN in response to receiving the user's request to connect to the Internet via the secure VPN, wherein the user is simultaneously connected to the Internet via the non-secure ISP connection and the secure VPN connection over a single DSL.

11. The method according to claim 10, further comprising prompting the user, connected to the non-secure ISP, with an option of disconnecting from the non-secure ISP in response to the request from the user to connect to the Internet via the secure VPN, the prompting including an indication as to a current Internet connection status of the user.

12. The method according to claim 10, further comprising receiving, from the user, a request to connect to at least one of a plurality of Internet services; and connecting the user with the at least one Internet service in response to the user's request.

13. The method according to claim 12, further comprising displaying at least one Internet service window devoid of navigational controls.

14. The method according to claim 12, wherein one of the plurality of Internet services comprises a movie service.

15. The method according to claim 12, wherein one of the plurality of Internet services comprises a game service.

16. The method according to claim 12, wherein one of the plurality of Internet services comprises a music service.

17. The method according to claim 12, wherein one of the plurality of Internet services comprises a music video service.

18. A method of providing access to and management of Internet connections via a graphical user interface, the method comprising:

displaying the graphical user interface, the graphical user interface having a first pane for display of Internet connection identifiers, a second pane for display of Internet service identifiers, a third pane for display of bandwidth and connection information, and a fourth pane for display of network status and network provider messages;

receiving, from a user, a request to connect to the Internet via a non-secure ISP, the user having indicated the request to connect to the Internet via the non-secure ISP in the first pane of the graphical user interface;

connecting the user with the Internet via the non-secure ISP in response to receiving the user's request to connect to the Internet via the non-secure ISP;

receiving, from the user, a request to connect to the Internet via a secure VPN, the user having indicated the request to connect to the Internet via the secure VPN in the first pane of the graphical user interface; and connecting the user with the Internet via the secure VPN in response to receiving the user's request to connect to the Internet via the secure VPN, wherein the user is simultaneously connected to the Internet via the non-secure ISP connection and the secure VPN connection over a single DSL.

19. The method according to claim 18, further comprising prompting the user, connected to the non-secure ISP, with an option of disconnecting from the non-secure ISP in response to the request from the user to connect to the Internet via the secure VPN, the prompting including an indication as to a current Internet connection status of the user.

* * * * *

UNITED STATES PATENT AND TRADEMARK OFFICE
CERTIFICATE OF CORRECTION

| | | |
|---|---|---|
| PATENT NO. | : 7,337,220 B2 | Page 1 of 1 |
| APPLICATION NO. | : 09/983451 | |
| DATED | : February 26, 2008 | |
| INVENTOR(S) | : Kortum et al. | |

It is certified that error appears in the above-identified patent and that said Letters Patent is hereby corrected as shown below:

On cover page, page 2, under References Cited in the printed patent, "5,579,384 A 11/1996 Seymor" should read --5,579,384 A 11/1996 Seymour--.

Signed and Sealed this

Nineteenth Day of August, 2008

JON W. DUDAS
*Director of the United States Patent and Trademark Office*